(12) United States Patent
Shibuya et al.

(10) Patent No.: US 9,935,820 B2
(45) Date of Patent: Apr. 3, 2018

(54) TRANSMITTER AND TRANSMISSION SYSTEM

(71) Applicant: FUJITSU LIMITED, Kawasaki-shi, Kanagawa (JP)

(72) Inventors: Kazuhiro Shibuya, Fujisawa (JP); Masayuki Ono, Kawasaki (JP); Tatsuya Kawasumi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 183 days.

(21) Appl. No.: 14/837,454

(22) Filed: Aug. 27, 2015

(65) Prior Publication Data

US 2016/0099831 A1 Apr. 7, 2016

(30) Foreign Application Priority Data

Oct. 1, 2014 (JP) ................. 2014-203239

(51) Int. Cl.
| | |
|---|---|
| *H04L 1/00* | (2006.01) |
| *H04L 12/24* | (2006.01) |
| *H04B 10/038* | (2013.01) |
| *H04J 3/16* | (2006.01) |
| *H04Q 11/00* | (2006.01) |
| *H04L 12/26* | (2006.01) |

(52) U.S. Cl.
CPC ....... *H04L 41/0686* (2013.01); *H04B 10/038* (2013.01); *H04J 3/1652* (2013.01); *H04Q 11/0066* (2013.01); *H04L 41/0668* (2013.01); *H04L 43/026* (2013.01); *H04Q 2011/0081* (2013.01)

(58) Field of Classification Search
CPC ............. H04L 41/0686; H04L 41/0668; H04L 43/026; H04B 10/038; H04J 3/1652; H04Q 11/0066; H04Q 2011/0081
USPC .......................................... 370/242
See application file for complete search history.

(56) References Cited

U.S. PATENT DOCUMENTS

| | | | |
|---|---|---|---|
| 2004/0202198 A1* | 10/2004 | Walker ................. | H04J 3/1658 370/474 |
| 2006/0274782 A1 | 12/2006 | Rikitake | |
| 2011/0292788 A1* | 12/2011 | Tsuchiya ............. | H04L 12/4625 370/218 |
| 2012/0177360 A1* | 7/2012 | Uchida ................... | H04L 41/06 398/1 |
| 2012/0269093 A1* | 10/2012 | Grammel ............... | H04L 41/12 370/254 |

(Continued)

FOREIGN PATENT DOCUMENTS

| | | |
|---|---|---|
| JP | 5-30075 | 2/1993 |
| WO | 2005/079015 A1 | 8/2005 |

*Primary Examiner* — Faisal Choudhury
(74) *Attorney, Agent, or Firm* — Staas & Halsey LLP

(57) ABSTRACT

A transmitter used in a transmission system in which a first network is connected, via a second network, to a third network, the transmitter being arranged between the first network and the second network, the transmitter includes: a generator configured to specify an identifier of data area in which communication data affected by a failure occurred in the first network are stored, in a frame transmitted from the second network, and to generate failure information associated with the identifier specified; and a transmitter configured to transmit the failure information generated by the generator, via the second network, to another transmitter arranged between the second network and the third network.

9 Claims, 14 Drawing Sheets

(56) References Cited

U.S. PATENT DOCUMENTS

2014/0126908 A1* 5/2014 Diab ................. H04L 12/12
398/58
2014/0233373 A1* 8/2014 O'Connor ........... H04L 41/0663
370/228

* cited by examiner

FIG.9

| ODU#1 | ODU#2 | ... |

| PORT INFORMATION | STATUS |
|---|---|
| SLOT#1, PORT#1, FLOW#1 | Normal |
| SLOT#1, PORT#1, FLOW#2 | Normal |
| SLOT#1, PORT#2, FLOW#3 | Alarm |
| SLOT#2, PORT#1, FLOW#4 | Normal |
| ⋮ | ⋮ |

TRANSMITTER AND TRANSMISSION SYSTEM

CROSS-REFERENCE TO RELATED APPLICATION

This application is based upon and claims the benefit of priority from the prior Japanese Patent Application No. 2014-203239 filed on Oct. 1, 2014, the entire contents of which are incorporated herein by reference.

FIELD

The embodiments discussed herein are related to a transmitter and a transmission system.

BACKGROUND

In recent years, network traffics have been rapidly increased with the wide spread of the Internet and mobile networks. Therefore, in carrier core networks, there is an urgent need to expand transmission capacity and the introduction of the OTN (Optical Transport Network) which realizes the transmission capacity of 100 Gbps is underway. Moreover, expansion of transmission capacity of access networks using Ethernet® technology and IP (Internet Protocol) technology is progressing as well.

In addition, there have been known techniques for informing each device in a network of an alarm when a failure occurs in the network. There have been also known techniques in which two Ethernets are connected to an SDH (Synchronous Digital Hierarchy) network and, if a failure occurs in the Ethernet of one side, the Ethernet of one side is switched to the Ethernet of the other side.

Related technologies are disclosed in, for example, Japanese Laid-Open Patent Publication No. 05-30075 and International Publication Pamphlet No. WO2005-079015.

SUMMARY

According to an aspect of the inventions, a transmitter used in a transmission system in which a first network is connected, via a second network, to a third network, the transmitter being arranged between the first network and the second network, the transmitter includes: a generator configured to specify an identifier of data area in which communication data affected by a failure occurred in the first network are stored, in a frame transmitted from the second network, and to generate failure information associated with the identifier specified; and a transmitter configured to transmit the failure information generated by the generator, via the second network, to another transmitter arranged between the second network and the third network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a view illustrating an example of a failure information table according to the second embodiment;

DESCRIPTION OF EMBODIMENTS

If a communication failure such as a disconnection occurs in Ethernet, a device in the Ethernet may detect the communication failure in a short time (e.g., within less than one millisecond). Even if a failure occurs in the OTN, a device in the OTN may detect the failure in a short time (e.g., within less than one millisecond). However, in a network system including a plurality of Ethernets interconnected via the OTN, it is difficult for a device in one Ethernet to quickly detect a failure occurred in an opposing side Ethernet via the OTN. This is because there is no agreement about the exchange of failure information between the Ethernets and the OTN.

In the following description, embodiments of a transmitter and a transmission system which are capable of quickly detecting a communication failure occurred in a network in a different network via a relay network will be described in detail with reference to the drawings. The following embodiments are not intended to limit the scope of the present disclosure. The disclosed embodiments may be used in proper combination unless contradictory.

First Embodiment

Figure 1:
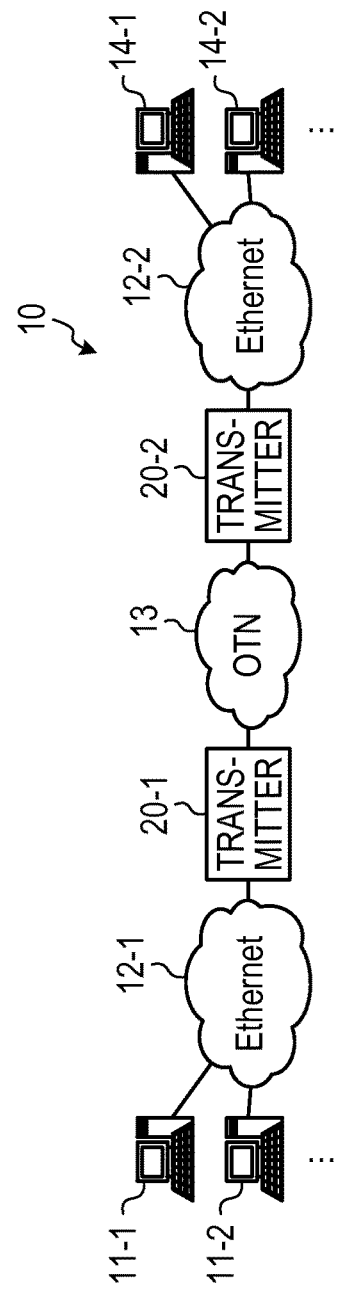
FIG. 1 is a view illustrating an example of a transmission system.

FIG. 1 is a view illustrating an example of a transmission system 10. The transmission system 10 includes a plurality of transmitters 20. Each of the transmitters 20 is provided between an Ethernet 12 and an OTN 13. Each of the transmitters 20 relays communication data, which are transmitted by communication devices 11 connected to the Ethernet 12, to communication devices 14 connected to another Ethernet 12 via the OTN 13.

In the example of FIG. 1, a transmitter 20-1 receives the communication data transmitted by the communication devices 11 via an Ethernet 12-1. The transmitter 20-1 relays the received communication data to a transmitter 20-2, which is connected to an Ethernet 12-2, via the OTN 13. The transmitter 20-2 transmits the communication data received via the OTN 13 to the communication devices 14 which are transmission destinations. Similarly, the transmitter 20-2 relays communication data, which are transmitted from the communication devices 14 via the Ethernet 12-2, to the transmitter 20-1 via the OTN 13. The transmitter 20-1 transmits the communication data received via the OTN 13 to the communication devices 11, which are transmission destinations, via the Ethernet 12-1.

Although it is illustrated in FIG. 1 that each transmitter 20 is connected to one Ethernet 12 and one OTN 13 for the purpose of simplification of description, an example in which each transmitter 20 is connected to a plurality of Ethernets 12 and a plurality of OTNs 13 will be described in the following description.

Figure 2:
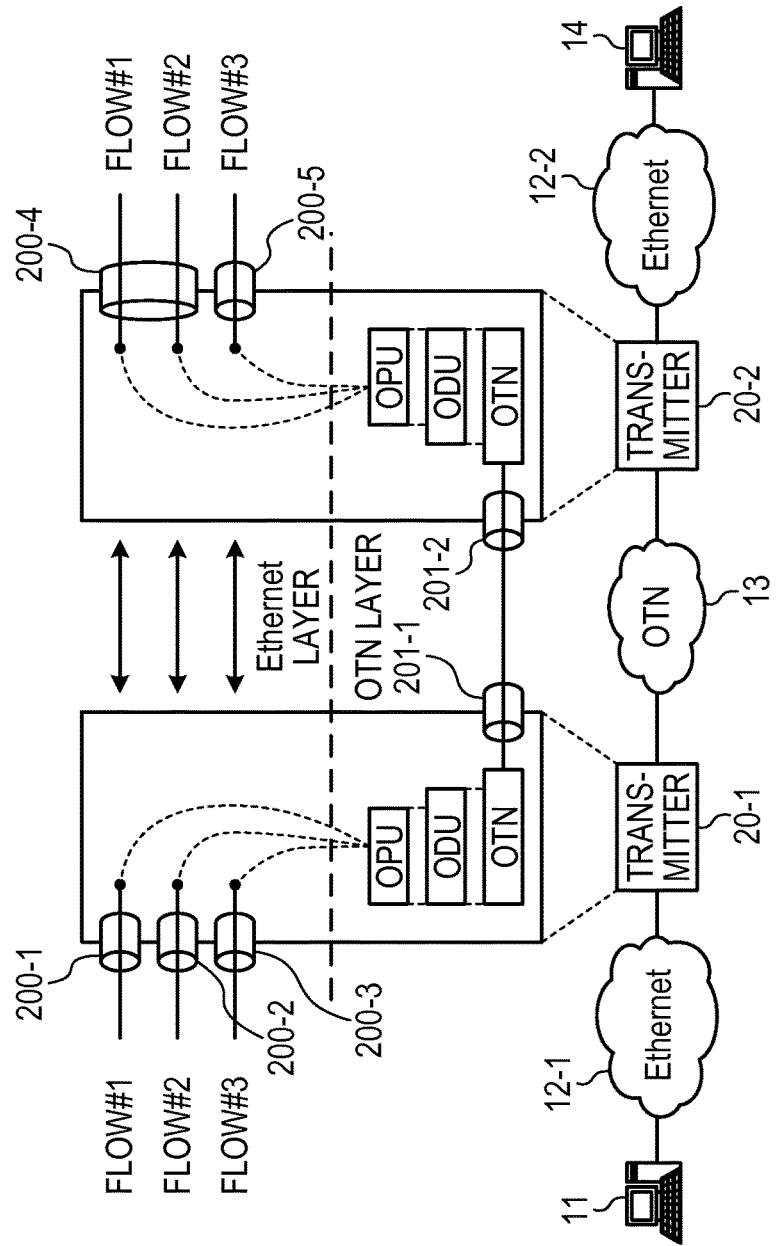
FIG. 2 is a view explaining an example of a communication data flow.

FIG. 2 illustrates a view explaining an example of a communication data flow. In the example of FIG. 2, ports 200-1 to 200-3 of the transmitter 20-1 are connected to the Ethernet 12-1. The transmitter 20-1 transmits/receives communication data of flow #1 via the Ethernet 12-1 connected to the port 200-1. Similarly, the transmitter 20-1 transmits/receives communication data of flow #2 via the Ethernet 12-1 connected to the port 200-2 and transmits/receives communication data of flow #3 via the Ethernet 12-1 connected to the port 200-3.

Ports 200-4 and 200-5 of the transmitter 20-2 are connected to the Ethernet 12-2. The transmitter 20-2 transmits/receives the communication data of flows #1 and #2 via the Ethernet 12-2 connected to the port 200-4 and transmits/receives the communication data of flow #3 via the Ethernet 12-2 connected to the port 200-5.

In embodiments, the term "flow" refers to a series of flow of communication data used in a period (session). Each flow is identified by information such as a source communication device IP address, a destination communication device IP address, a source communication port number, a destination communication device port number and a protocol type.

The transmitter 20-1 receives the communication data of each flow via the ports 200-1 to 200-3 in an Ethernet layer and encapsulates the received communication data according to, for example, a GFP (Generic Framing Procedure)-F scheme. Then, the transmitter 20-1 generates the OPU (Optical-channel Payload Unit) by adding a predetermined overhead to a payload including the encapsulated communication data. In addition, the transmitter 20-1 generates the ODU (Optical-channel Data Unit) by adding a predetermined overhead to a payload including the OPU. The transmitter 20-1 generates OTU (Optical-channel Transport Unit) by mapping the ODU onto a specified position of the payload and adding a predetermined overhead to the payload. Then, the transmitter 20-1 transmits an OTN frame including the generated OTU to the OTN 13 via a port 201-1.

The transmitter 20-2 receives the OTN frame from a port 201-2 via the OTN 13. The transmitter 20-2 extracts the ODU from the OTU of the received OTN frame and extracts the OPU from the ODU. The transmitter 20-2 extracts the capsulated communication data from the OTU, decapsulates the extracted communication data, and extracts the communication data of the Ethernet layer from the decapsulated communication data. Then, the transmitter 20-2 transmits the communication data via the port 200-4 or 200-5.

The communication data included in each flow are in the unit of ODU and mapped onto the specified position in the OTU payload. Each transmitter 20 is provided with the ports 200 through which the communication data included in the ODU for each ODU are output. Thus, the communication data transmitted from the communication devices 11 connected to the Ethernet 12-1 of one side are transmitted to the communication devices 14 which are transmission destinations connected to the Ethernet 12-2 of the other side.

Figure 3:
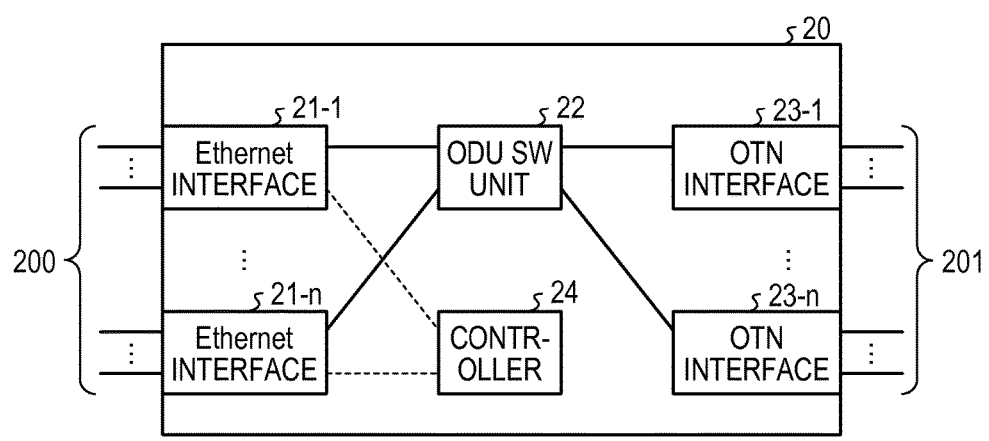
FIG. 3 is a view illustrating an example of hardware of a transmitter.
Figure 4:
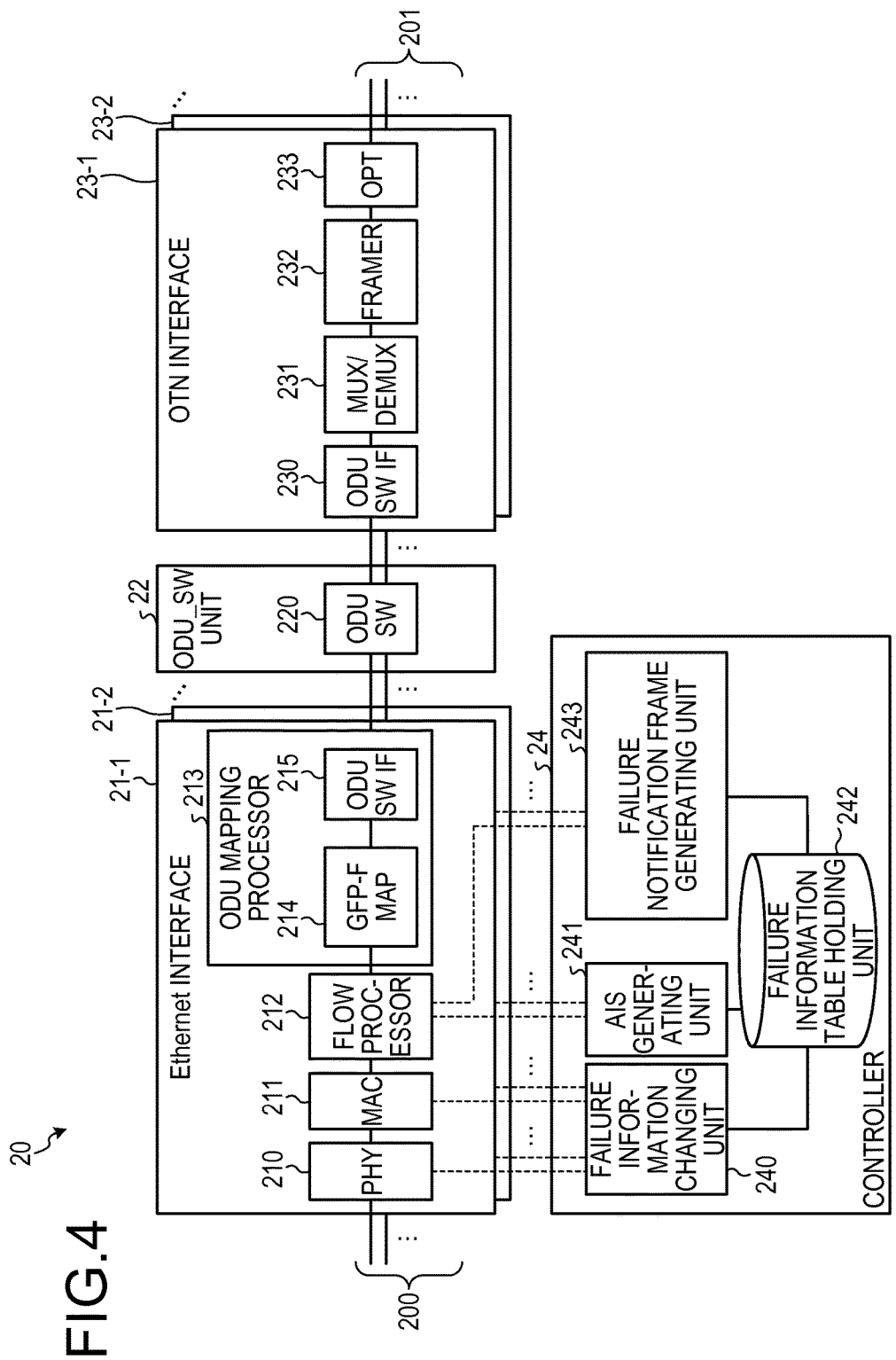
FIG. 4 is an example of a functional block diagram of the transmitter according to the first embodiment.

FIG. 3 is a view illustrating an example of hardware of a transmitter 20. FIG. 4 is an exemplary functional block diagram of the transmitter 20 according to the first embodiment. For example, as illustrated in FIG. 3, the transmitter 20 includes a plurality of Ethernet interfaces 21-1 to 21-n, an ODU_SW unit 22, a plurality of OTN interfaces 23-1 to 23-n, and a controller 24. In the following description, the plurality of Ethernet interfaces 21-1 to 21-n and the plurality of OTN interfaces 23-1 to 23-n are collectively referred to as an Ethernet interface 21 and an OTN interface 23, respectively, unless they are distinguished from each other. In FIGS. 3 and 4, a signal line through which communication data are mainly transmitted is indicated by a solid line and a signal line through which a control signal is transmitted is indicated by a dotted line.

Each Ethernet interfaces 21 includes PHY 210, MAC 211, a flow processor 212 and ODU mapping processor 213. The PHY 210 performs signal control and monitoring of a physical layer in the Ethernet 12 connected to the ports 200. Upon detecting a failure of a physical line in the Ethernet 12 connected to the ports 200, the PHY 210 transmits information of the ports 200 connected to the Ethernet 12 in which the failure occurred, to the controller 24. The MAC 211 performs signal control and monitoring of an MAC (Media Access Control) layer in the Ethernet 12 connected to the ports 200. Upon detecting a failure in the MAC layer in the Ethernet 12 connected to the ports 200, the MAC 211 transmits information of the ports 200 connected to the Ethernet 12 in which the failure occurred, to the controller 24.

The flow processor 212 performs a flow control of the Ethernet with a communication device belonging to the Ethernet 12 connected to the ports 200. The flow processor 212 transmits an Ethernet frame including the communication data received via the PHY 210 and the MAC 211 to the ODU mapping processor 213. The flow processor 212 transmits an Ethernet frame, which is received from the ODU mapping processor 213, from the ports 200 to the Ethernet 12 via the PHY 210 and the MAC 211. Upon receiving the AIS (Alarm Indication Signal) from the controller 24, the flow processor 212 transmits the received AIS from the ports 200 to the Ethernet 12 via the PHY 210 and the MAC 211. Upon receiving a failure notification frame from the ODU mapping processor 213, the flow processor 212 transmits the received failure notification frame to the controller 24.

The ODU mapping processor 213 includes a GFP-F map 214 and an ODU_SW_IF 215. The GFP-F map 214 holds an association table with ODU identification numbers mapped to Ethernet frames including the communication data included in the flow for each flow. The GFP-F map 214 generates an OPU by encapsulating the Ethernet frame received from the flow processor 212. The GFP-F map 214 generates an ODU by adding an overhead to the OPU. The GFP-F map 214 maps the generated ODU onto an ODU position of an identification number corresponding to a flow to which the communication data in the Ethernet frame belong, by referring to the association table. The ODU_SW_IF 215 transmits the ODU, together with the ODU mapping information, to the ODU_SW unit 22.

Upon receiving the ODU, the ODU_SW_IF 215 transmits the received ODU to the GFP-F map 214. The GFP-F map 214 extracts the OPU from the ODU received from the ODU_SW_IF 215 and restores the Ethernet frame by decapsulating the extracted OPU. The GFP-F map 214 transmits the restored Ethernet frame to the flow processor 212.

The ODU_SW unit 22 includes an ODU_SW 220. The ODU_SW 220 performs a circuit switching required at an ODU level for the ODU received from the ODU_SW_IF 215 and transmits the ODU to the OTN interface 23. The ODU_SW 220 also transmits the ODU, which is received from the OTN interface 23, to the ODU_SW_IF 215.

The OTN interface 23 includes an ODU_SW_IF 230, a MUX/DEMUX 231, a framer 232 and an OPT 233. The MUX/DEMUX 231 receives the ODU, which is transmitted from the ODU_SW 220, via the ODU_SW_IF 230, multiplexes the received ODU, and transmits the multiplexed ODU to the framer 232. The MUX/DEMUX 231 receives the multiplexed ODU from the framer 232, demultiplexes the multiplexed ODU, and transmits the demultiplexed ODU to the ODU_SW 220 via the ODU_SW_IF 230.

Upon receiving the multiplexed ODU from the MUX/DEMUX 231, the framer 232 generates an OUT by adding an overhead to the received ODU. The framer 232 transmits an OTN frame including the generated OTU to the OPT 233. In addition, the framer 232 extracts the OTU from the OTN frame received from the OPT 233 and extracts the multiplexed ODU from the OTU. Then, the framer 232 transmits the extracted ODU to the MUX/DEMUX 231.

The OPT 233 converts an electrical signal indicating the OTN frame, which is received from the framer 232, into an optical signal and transmits the optical signal indicating the OTN frame to the OTN 13 via the ports 201. In addition, the OPT 233 converts an optical signal, which is received from the OTN 13 via the ports 201, into an electrical signal indicating the OTN frame and transmits the electrical signal of the OTN frame to the framer 232.

Figure 5:
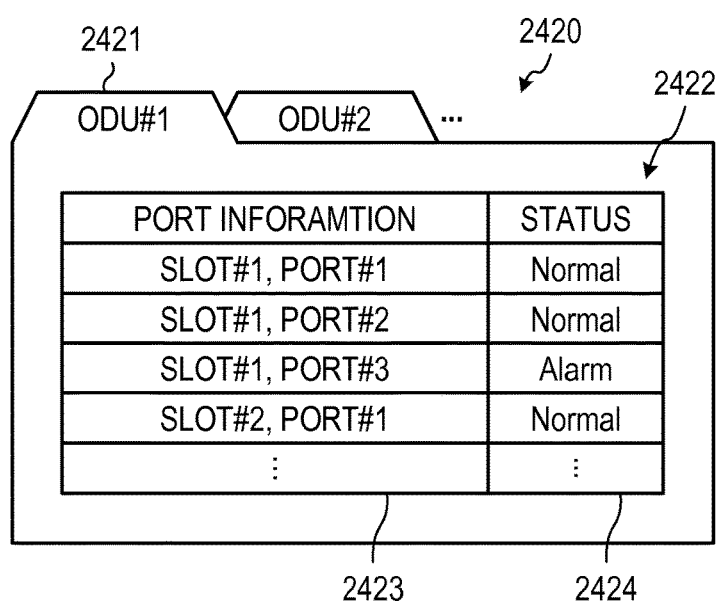
FIG. 5 is a view illustrating an example of a failure information table according to the first embodiment.

The controller 24 includes a failure information changing unit 240, an AIS generating unit 241, a failure information table holding unit 242, and a failure notification frame generating unit 243. The failure information table holding unit 242 holds a failure information table 2420 as illustrated in FIG. 5. FIG. 5 is a view illustrating an example of the failure information table 2420 according to the first embodiment. The failure information table 2420 holds an individual table 2422 for each ODU number 2421 indicating a mapping position in the OTU to which each ODU is mapped. Each individual table 2422 stores information indicating a status 2424 of the Ethernet 12, which is associated with port information 2423 identifying each port 200 connected to the Ethernet 12. The ODU number 2421 is one example of an identifier of data, which stores communication data flowing through the Ethernet 12, in the OTN frame transmitted from the OTN 13.

In the failure information table 2420 illustrated in FIG. 5, "slot#1, port#1" in the port information 2423 indicates that an Ethernet interface 21 mounted in a No. 1 slot provided in a housing of a transmitter 20 has a No. 1 port 200. If a failure occurs in an Ethernet 12 connected to a port 200 specified in the port information 2423, an "Alarm" is stored in the associated status 2424. When no failure occurs in an Ethernet 12 connected to a port 200 specified in the port information 2423, a "Normal" is stored in the associated status 2424.

The failure information changing unit 240 monitors whether or not information of the port 200 connected to the Ethernet 12 in which a failure occurs is received from the PHY 210 or the MAC 211. If the information of the port 200 connected to the Ethernet 12 in which the failure occurs is received, the failure information changing unit 240 specifies the port information 2423 associated with the received information of the port 200 by referring to the failure information table 2420. The failure information changing unit 240 renews the status 24234, which is associated with the specified port information 2423, to "Alarm."

The failure notification frame generating unit 243 monitors whether or not the status 2424 is renewed to "Alarm," by referring to the failure information table 2420 in the failure information table holding unit 242. If it is detected that the status 2424 in the failure information table 2420 is renewed to "Alarm," the failure notification frame generating unit 243 specifies the ODU number 2421 associated with the individual table 2422 with the status 2424 renewed to "Alarm." The specified ODU number 2421 is one example of an identifier of data area in which communication data affected by a failure of the Ethernet 12 are stored, in the OTN frame transmitted to the OTN 13. Then, the failure notification frame generating unit 243 generates a failure notification frame 30 illustrated in FIG. 6 and transmits the generated failure notification frame 30 to the flow processor 212.

Figure 6:
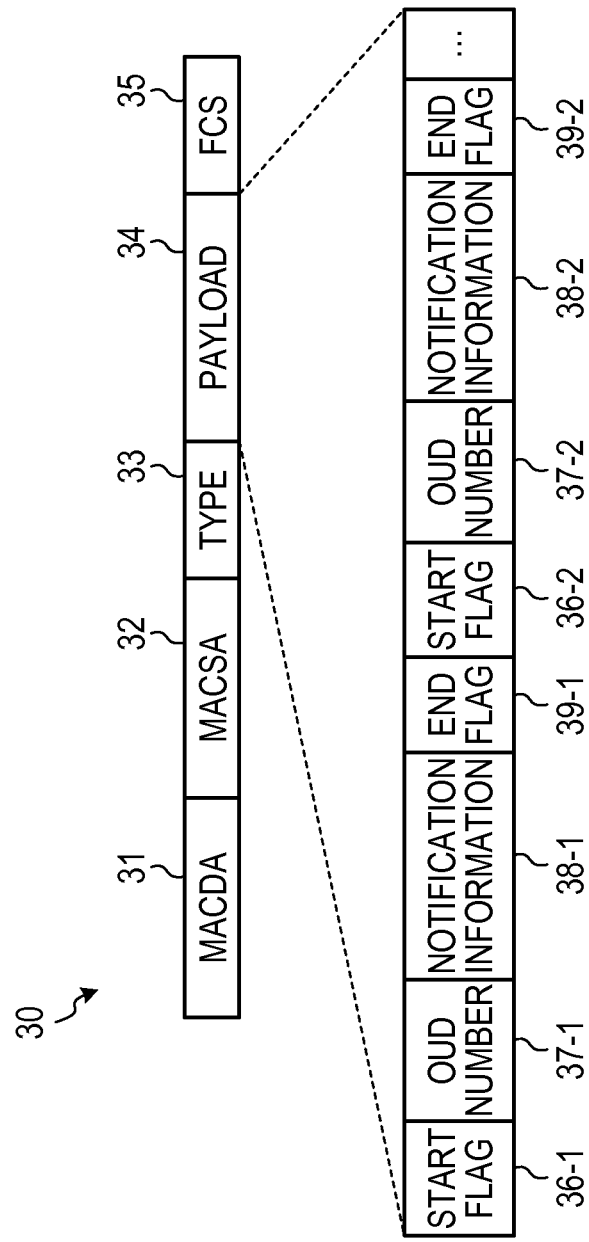
FIG. 6 is a view illustrating an example of a failure notification frame.

FIG. 6 is a view illustrating an example of the failure notification frame. The failure notification frame 30 includes a destination MAC address (MACDA) 31, source MAC address (MACSA) 32, a type 33, a payload 34 and FCS (Frame Check Sequence) 35. The MACDA 31 is set with an MAC address of an opposing side transmitter 20 to relay communication data allocated to the ODU number 2421 associated with the individual table 2422 with the status 2424 renewed to "Alarm." The MACSA 32 is set with an MAC address of a source transmitter 20. The type 33 is set with, for example, a protocol type. The FCS 35 is set with an error detecting code of the failure notification frame 30.

The payload 34 stores a start flag 36, an ODU number 37, notification information 38 and an end flag 39. The payload 34 stores failure information relating to one port between the start flag 36 and the end flag 39. The ODU number 37 stores the ODU number 2421 associated with the renewed individual table 2422. The notification information 38 stores the port information 2423 and the status 2424 associated with the port information 2423 in the renewed individual table 2422. Failure information relating to one port associated with the ODU number 37 is stored between the start flag 36 and the end flag 39.

In this embodiment, even when the status 2424 associated with the port information 2423 is renewed to "Alarm," the failure notification frame generating unit 243 includes the overall information of the renewed individual table 2422 in the failure notification frame 30. Alternatively, the failure notification frame generating unit 243 may generate the failure notification frame 30 for only the port information 2423 associated with the status 2424 renewed to "Alarm" in the renewed individual table 2422. This makes it possible to reduce the amount of data of the failure notification frame 30.

Upon receiving the failure notification frame 30 from the flow processor 212, the AIS generating unit 241 extracts the ODU number 37 from the payload 34 of the failure notification frame 30. The AIS generating unit 241 specifies the individual table 2422 associated with the ODU number 37 extracted from the failure notification frame 30 by referring to the failure information table 2420 in the failure information table holding unit 242. In addition, the AIS generating unit 241 extracts the port information 2423 stored in the specified individual table 2422. The port 200 specified by the extracted port information 2423 is a port 200 of an AIS transmission target.

Next, the AIS generating unit 241 generates an AIS indicating whether or not a communication failure occurs in a different Ethernet 12 via the OTN 13. An example of the AIS may include an EthAIS (Ethernet Alarm Indication Signal) specified in, for example, Y.1731. The AIS generating unit 241 transmits the generated AIS, together with information indicating each port 200 of an AIS transmission target, to the flow processor 212 connected to the port 200.

Upon receiving the AIS from the AIS generating unit 241, the flow processor 212 broadcasts the received AIS from the port 200 of the AIS transmission target to the Ethernet 12 via the MAC 211 and the PHY 210.

The AIS generating unit 241 may inform the communication device in the Ethernet 12 connected to the port 200 that there occurs a communication failure, by shutting down each port 200 specified by the port information 2423. This makes it possible to omit the AIS generation and transmission process and inform the communication device in the Ethernet 12 of the failure occurrence more quickly.

Here, the communication device in the Ethernet can use a CC (Continuity Check) function of service OAM (Operations Administration Maintenance) to perform communication confirmation of the communication data in the Ethernet 12. If the number of times by which a response of a frame for communication confirmation is not received in a predetermined period of time exceeds the predetermined number of times, the CC function detects that there occurs a communication failure. The CC function may be among Ethernets 12 via the OTN 13.

Here, assuming that a time-out period of a response to the frame for communication confirmation is at least, for example, about several milliseconds and it is determined that there occurs a failure if the response is consecutively timed-out a predetermined number of times, the time taken from the occurrence to detection of the failure is about ten milliseconds. However, if a transmission interval of the frame for communication confirmation is set to a minimum, the traffic of the frame for communication confirmation in the network is increased as much and a pressure is put on a usable bandwidth of a user packet. Therefore, in many cases, the transmission interval of the frame for communication confirmation is set to about several hundred milliseconds to about several seconds rather than the minimum. In these cases, the time taken from the occurrence to detection of the failure is several ten seconds in some cases. Therefore, although a failure is detected in less than one millisecond in a device in one Ethernet 12, it may take several ten seconds for an opposing side Ethernet 12 to detect the failure occurred in the one Ethernet 12.

In contrast, in the transmitter 20 according to this embodiment, when a failure occurs in the Ethernet 12, the PHY 210 or the MAC 211 can detect the failure of the Ethernet 12 in less than one millisecond. In addition, the status 2424 in the failure information table 2420 is changed to "Alarm" by the failure information changing unit 240 and the failure notification frame 30 generated by the failure notification frame generating unit 243 is transmitted to another transmitter 20 via the OTN 13. Upon receiving the failure notification frame 30, the transmitter 20 (another transmitter 20) transmits an AIS to an Ethernet 12 connected with a communication device which communicates with the communication device in the Ethernet 12 in which the failure occurs, Therefore, in this embodiment, the communication device connected to the opposing side Ethernet 12 is informed of the failure information of the Ethernet 12 in several milliseconds after the failure occurs in the Ethernet.

Accordingly, a communication device connected to one Ethernet 12 may quickly detect a failure of a different Ethernet 12 and may quickly start an action such as a switching to a backup path. This makes it possible to shorten a stop period of service.

In addition, in the CC function of service OAM, even if a failure is detected, it is difficult to discriminate whether the failure occurs in the OTN 13 or in the Ethernet 12 of different side. Therefore, a separate examination to discriminate the location of the failure is carried out. In contrast, the transmitter 20 of this embodiment informs a communication device connected to the Ethernet 12 of the other side via the OTN 13 of the failure information of the Ethernet 12 of one side. Thus, in the communication apparatus connected to the Ethernet 12 of the other side, it is possible to save the work time to discriminate whether a failure occurs in the OTN13 or in the Ethernet 12 of one side.

In the CC function of service OAM, when the transmission interval of the frame for communication confirmation is shortened, it is possible to shorten the time taken to detect the failure. However, the shortened transmission interval of the frame for communication confirmation increases communication traffic by the frame for communication confirmation. Since a communication failure such as a disconnection does not occur so often, most of the frame for communication confirmation will flow in vein in the network.

In contrast, upon detecting a communication failure in the Ethernet 12 of one side, the transmitter 20 of this embodiment informs a transmitter 20 connected to the Ethernet 12 of the other side via the OTN 13 of failure information. This makes it possible to avoid an increase in communication traffic by a frame transmitted in order to detect the presence of communication failure.

Figure 7:
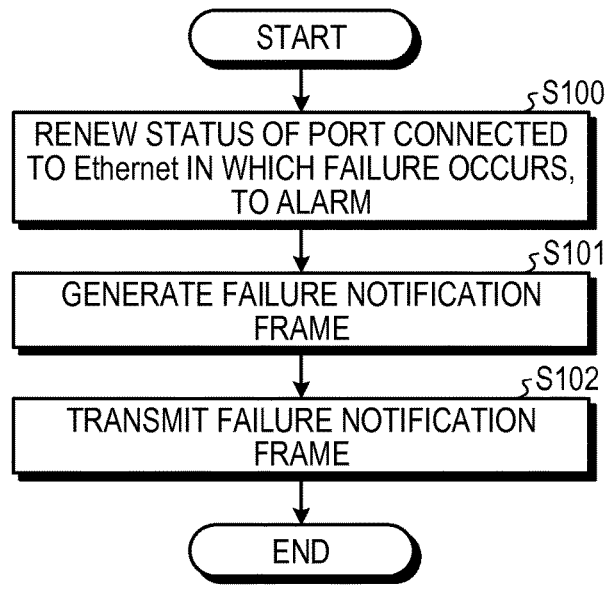
FIG. 7 is a flowchart illustrating an example of a failure information transmission process according to the first embodiment.

FIG. 7 is a flowchart illustrating an example of a failure information transmission process according to the first embodiment. For example, when the failure information changing unit 240 receives information of a port 200 connected to an Ethernet 12 in which a failure occurs, from the PHY 210 or the MAC 211, the transmitter 20 starts the failure information transmission process illustrated in this flowchart.

First, the failure information changing unit 240 specifies the port information associated with the information of the port 200 which is received from the PHY 210 or the MAC 211. Then, the failure information changing unit 240 renews the status 2424 associated with the specified port information 2423 to "Alarm" (S100).

Next, the failure notification frame generating unit 243 detects whether or not any status in the failure information table 2420 is renewed to "Alarm" and specifies the renewed individual table and the ODU number associated with the individual table. Then, the failure notification frame generating unit 243 uses the specified individual table and ODU number to generate the failure notification frame 30 illustrated in FIG. 6 (S101).

Next, the failure notification frame generating unit 243 transmits the generated failure notification frame 30 to the flow processor 212. The flow processor 212 transmits the failure notification frame 30, which is received from the failure notification frame generating unit 243, to the ODU mapping processor 213. Thus, the failure notification frame 30 is transmitted to a transmitter 20 connected to an opposing side Ethernet 12 via the OTN 13 (S102).

Figure 8:
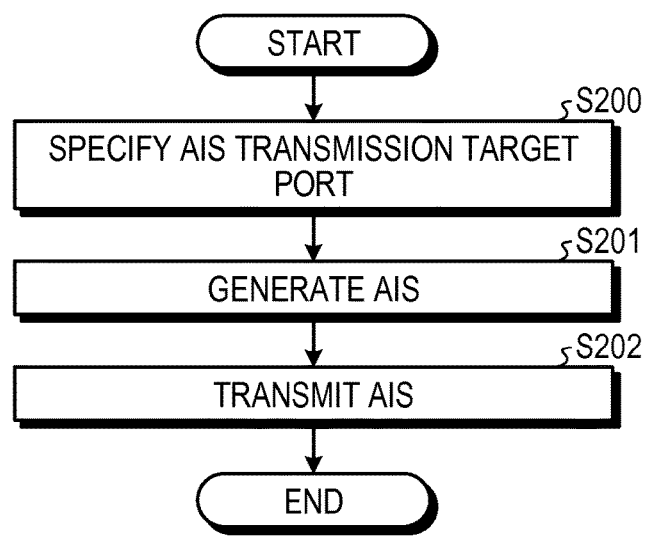
FIG. 8 is a flowchart illustrating an example of a failure notification process according to the first embodiment.

FIG. 8 is a flowchart illustrating an example of a failure notification process according to the first embodiment. For example, when the flow processor 212 receives the failure notification frame 30 from the other transmitter 20 via the OTN 13, the transmitter 20 starts the failure notification process illustrated in this flowchart.

First, the flow processor 212 transmits the failure notification frame 30, which is received from the other transmitter 20, to the AIS generating unit 241. The AIS generating unit 241 extracts the ODU number 37 from the payload 34 in the failure notification frame 30 which is received from the flow processor 212. Then, the AIS generating unit 241 specifies the individual table 2422 associated with the ODU number 37 extracted from the failure notification frame 30 by referring to the failure information table 2420 in the failure information table holding unit 242.

Then, the AIS generating unit 241 extracts the port information 2423 stored in the specified individual table 2422. Then, the AIS generating unit 241 specifies each port 200 identified by the port information 2423 extracted from the individual table 2422, as a port 200 of an AIS transmission target (S200).

Next, the AIS generating unit 241 generates an AIS indicating whether or not a communication failure occurs in the opposing side Ethernet 12 via the OTN 13 (S201). Then, the AIS generating unit 241 transmits the generated AIS, together with information indicating the port 200 of the AIS transmission target, to the flow processor 212 connected to the port 200 of the AIS transmission target.

The flow processor 212 transmits the AIS, which is received from the AIS generating unit 241, from the port 200 of the AIS transmission target to the Ethernet 12 via the MAC 211 and the PHY 210 (S202).

As described above, according to the transmitter 20 of this embodiment, the communication device connected to the opposing side Ethernet 12 via the OTN 13 can be quickly informed of the failure information of the Ethernet 12. In addition, according to the transmitter 20 of this embodiment, a work load to specify the location of a failure can be reduced.

Second Embodiment

A second embodiment is different from the first embodiment in which a failure of the Ethernet 12 is notified in the unit of port of the transmitter 20, in that the failure of the Ethernet 12 is notified in the unit of flow in the Ethernet 12 in which the failure occurs. The overview of the transmission system 10 and the transmitter 20 is the same as the first embodiment except for the following description and, therefore, explanation of which will not be repeated.

FIG. 9 is a view illustrating an example of the failure information table 2420 according to the second embodiment. In this embodiment, the failure information table 2420 is stored with information identifying a flow in the port 200 in addition to the information identifying each port 200 connected to the Ethernet 12 in the port information in each individual table 2422.

In the port information 2423 illustrated in FIG. 9, "slot#1, port#1, flow#1" in the port information 2423 indicates that communication data included in a flow identified by "#1" are flown in the No. 1 port 200 of the Ethernet interface 21 mounted in the No. 1 slot of the hosing of the transmitter 20.

Upon receiving the information of the port 200 connected to the Ethernet 12 in which a failure occurs, from the PHY 210 or the MAC 211, the failure information changing unit 240 refers to the failure information table 2420. Then, the failure information changing unit 240 specifies the port information 2423 of the port 200 connected to the Ethernet 12 in which the failure occurs. Then, the failure information changing unit 240 renews the status 2424 associated with the specified port information 2423 to "Alarm" indicating that the failure occurred.

Upon detecting that the status 2424 is renewed to "Alarm," the failure notification frame generating unit 243 generates the failure notification 30 illustrated in FIG. 6 and transmits the generated failure notification frame 30 to the flow processor 212. A flow number, together with a slot number and a port number, is stored in the notification information 38 in the failure notification frame 30 of this embodiment.

Upon receiving the failure notification frame 30 from the flow processor 212, the AIS generating unit 241 extracts the ODU number 37 and the notification information 38 including the status of "Alarm" from the payload 34 of the failure notification frame 30. Then, the AIS generating unit 241 specifies the individual table 2422 associated with the ODU number 37 extracted from the failure notification frame 30 by referring to the failure information table 2420 in the failure information table holding unit 242. Then, the AIS generating unit 241 extracts the port information 2423, which includes the flow number included in the notification information 38 extracted from the failure notification frame 30, from the port information 2423 stored in the specified individual table 2422. The flow number included in the notification information 38 extracted from the failure notification frame 30 is a flow number of the flow of the AIS transmission target.

Upon extracting the port information 2423 for all of the notification information 38 including the status of "Alarm" extracted from the failure notification frame 30, the AIS generating unit 241 refers to the failure information table 2420 for each port 200. Then, the AIS generating unit 241 determines for each port 200 whether or not all the flows in the port 200 are flows of the AIS transmission target. If all the flows in the port 200 are flows of the AIS transmission target, the AIS generating unit 241 specifies the port 200 as a shutdown target port 200. Then, the AIS generating unit 241 transmits an identification number of the shutdown target port 200 to the flow processor 212.

Next, the AIS generating unit 241 specifies an MAC address of a communication device of a transmission destination or transmission source of an AIS transmission target flow for the port 200 where some of the flows are AIS transmission target flows. Here, each transmitter 20 manages information (e.g., a source communication device IP address, a destination communication device IP address, a source communication port number, a destination communication device port number and a protocol type) identifying a flow for each flow.

Next, the AIS generating unit 241 generates an AIS indicating whether or not a communication failure occurs in the opposing side Ethernet 12 via the OTN 13. Then, the AIS generating unit 241 sets the specified MAC address in the destination MAC address of the generated AIS for the port 200 where some of the flows are AIS transmission target flows. Then, the AIS generating unit 241 transmits the generated AIS to the flow processor 212 connected to the port 200 specified by the extracted port information 2423.

The flow processor 212 unicasts the AIS, which is received from the AIS generating unit 241, to the port 200 connected to the Ethernet 12 to which a communication device of the destination MAC address of the AIS belongs, via the MAC 211 and the PHY 210.

A specific example will now be described with reference to FIG. 2. If a failure occurs in the Ethernet 12-1 connected to the port 200-1, it is necessary to inform a communication device, which belongs to the Ethernet 12-2 connected to the port 200-4 and performs communication of flow#1, that the failure occurs in the Ethernet 12-1. However, it is unnecessary to inform a communication device, which belongs to the Ethernet 12-2 connected to the port 200-4 and performs communication of flow#2, that the failure occurs in the Ethernet 12-1.

The transmitter 20 of this embodiment informs a communication device which performs communication, using a flow in the Ethernet 12 in which a failure occurs, that the failure occurs in the Ethernet 12. As a result, a notification of failure is not transmitted to a communication device which does not require the notification of failure. Therefore, it is possible to suppress an increase in communication traffic caused by the transmission of data for notifying the failure.

In addition, if the CC function of service OAM is used to monitor a failure of the Ethernet 12 for each flow, it means that frames for communication confirmation which are as many as the flows are transmitted to the network. More flows result in an increase in communication traffic in the network by the frames for communication confirmation. In addition, if the transmission interval of the frames for communication confirmation is shortened to reduce the time taken to detect a failure, communication traffic in the network is further increased by the frames for communication confirmation.

In contrast, the transmitter 20 of this embodiment specifies a flow in the Ethernet 12 of one side before a failure occurs, and informs a communication device using the specified flow to perform communication, among the communication devices belonging to the other opposing side Ethernet 12, that the failure occurs. Thus, it is possible to suppress an increase in communication traffic caused by the notification of the failure.

In addition, upon receiving an identification number of the shutdown target port 200 from the AIS generating unit 241, the flow processor 212 instructs the PHY 210 to shut down a port 200 corresponding to the received identification number. The PHY 210 shuts down the port 200 according to the instruction from the flow processor 212. Thus, it is possible to omit the process for generating the AIS and suppress an increase in communication traffic in the Ethernet 12 by the AIS transmitted by unicast.

Figure 10:
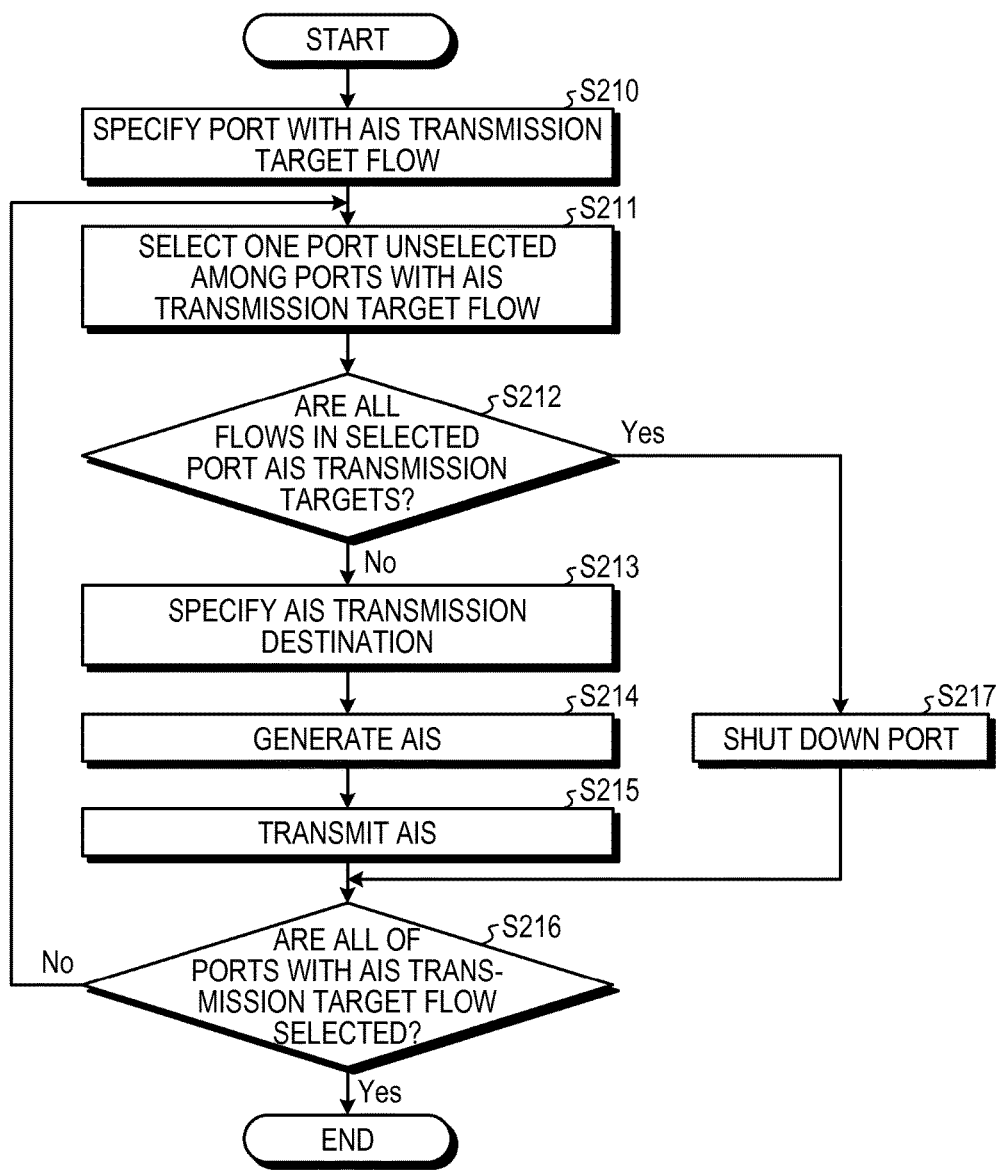
FIG. 10 is a flowchart illustrating an example of a failure notification process according to the second embodiment.

FIG. 10 is a flowchart illustrating an example of a failure notification process according to the second embodiment. For example, when the flow processor 212 receives the failure notification frame 30 from the other transmitter 20 via the OTN 13, the transmitter 20 starts the failure notification process illustrated in this flowchart.

First, the flow processor 212 transmits the failure notification frame 30, which is received from the other transmitter 20, to the AIS generating unit 241. The AIS generating unit 241 extracts the ODU number 37 and the notification information 38 including the status of "Alarm" from the failure notification frame 30 which is received from the flow processor 212. Then, the AIS generating unit 241 specifies the ports 200 with a transmission target flow of AIS by referring to the failure information table 2420 (S210).

Next, the AIS generating unit 241 selects a port 200 unselected among the ports 200 specified in Step S210 (S211). Then, the AIS generating unit 241 determines whether or not all of the flows in the port 200 selected in Step S211 are transmission target flows of AIS, by referring to the failure information table 2420 (S212).

If all of the flows in the port 200 are transmission target flows of AIS (Yes in S212), the AIS generating unit 241 transmits the identification number of the selected port 200 as a shutdown target port 200 to the flow processor 212. The flow processor 212 instructs the PHY 210 to shut down the port 200 corresponding to the identification number received from the AIS generating unit 241. The PHY 210 shuts down the port 200 according to the instruction from the flow processor 212 (S217). Then, the AIS generating unit 241 executes a process illustrated in Step S216.

If some of the flows in the port 200 are not transmission target flows of AIS (No in S212), the AIS generating unit 241 specifies an MAC address of a communication device of an AIS transmission destination for each flow of the AIS transmission target (S213).

Next, the AIS generating unit 241 generates an AIS indicating whether or not a communication failure occurs in the opposing side Ethernet 12 via the OTN 13 (S214). Then, the AIS generating unit 241 sets the MAC address, which is specified in Step S213, in a destination MAC address of the generated AIS. Then, the AIS generating unit 241 transmits the generated AIS to the flow processor 212 connected to the port 200 selected in Step S211. The flow processor 212 transmits the AIS, which is received from the AIS generating unit 241, from the port 200 via the MAC 211 and the PHY 210 (S215).

Next, the AIS generating unit 241 determines whether or not all of the ports specified in Step S210 are selected (S216). If there is a port 200 unselected among the ports 200 specified in Step S210 (No in S216), the AIS generating unit 241 executes the process illustrated in Step S211 again. In the meantime, if the AIS generating unit 241 selects all of the ports specified in Step S210 (Yes in S216), the transmitter 20 terminates the failure notification process illustrated in this flowchart.

As described above, according to the transmitter 20 of this embodiment, the communication device connected to the opposing side Ethernet 12 via the OTN 13 can be quickly informed of the failure information of the Ethernet 12. In addition, according to the transmitter 20 of this embodiment, it is possible to suppress an increase in communication traffic caused by the transmission of the failure notification.

Third Embodiment

A third embodiment is different from the first embodiment in which a communication device connected to the opposing side Ethernet 12 via the OTN 13 is informed of a failure of the Ethernet 12, in that a communication device connected to the Ethernet 12 is informed of a failure of the OTN 13. The overview of the transmission system 10 and the hardware of the transmitter 20 are the same as those of the first embodiment and, therefore, explanation of which will not be repeated.

Figure 11:
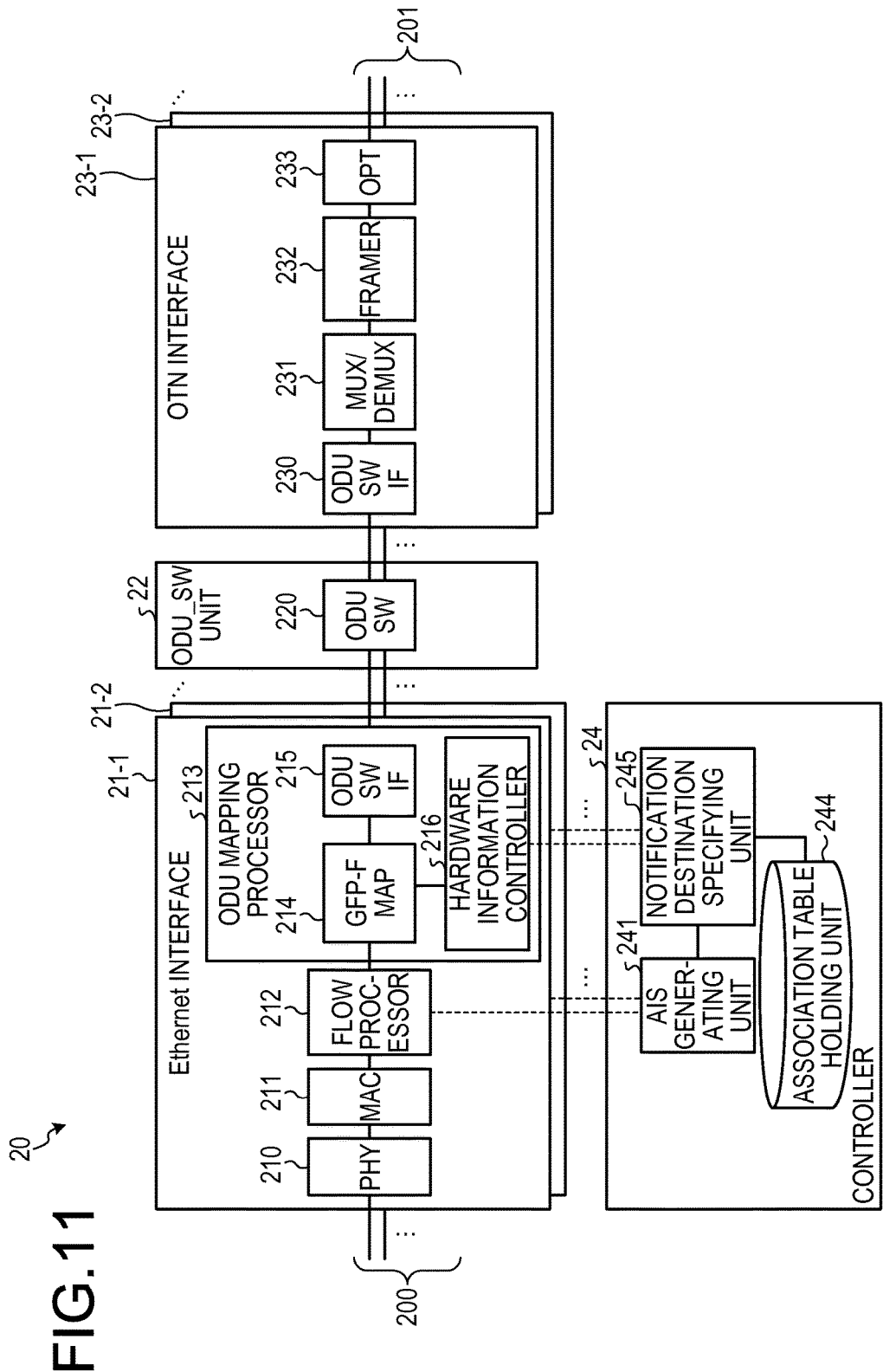
FIG. 11 is a view illustrating an example of a functional block of a transmitter according to a third embodiment.

FIG. 11 is a view illustrating an example of a functional block of the transmitter 20 according to the third embodiment. Except for the following description, the same elements and functions in FIG. 11 as FIG. 4 are denoted by the same reference numerals and, therefore, explanation of which will not be repeated.

The ODU mapping processor 213 includes a GFP-F map 214, an ODU_SW_IF 215, and a header information controller 216. The GFP-F map 214 generates an OPU by encapsulating the Ethernet frame received from the flow processor 212. The GFP-F map 214 transmits the generated OPU to the header information controller 216. The GFP-F map 214 receives an overhead from the header information controller 216 and generates an ODU by adding the overhead to the OPU. The flow processor 212 maps the generated ODU onto an ODU position of an identification number corresponding to a flow to which the communication data in the Ethernet frame belong, by referring to the association table.

The GFP-F map 214 extracts the overhead and OPU from the ODU received from the ODU_SW_IF 215 and transmits the extracted overhead and OPU to the header information controller 216. The GFP-F map 214 restores the Ethernet frame by decapsulating the OPU and transmits the restored Ethernet frame to the flow processor 212.

The header information controller 216 generates the ODU overhead and supplies it to the GFP-F map 214. Upon receiving an overhead and an OPU from the GFP-F map 214, the header information controller 216 calculates a check sum based on the received OPU. The header information controller 216 determines the presence of an error in the ODU by comparing the calculated check sum with a check sum included in the overhead. If an ODU error is detected, the header information controller 216 transmits an ODU number of the ODU and information of the port 201, which receives an OTN frame mapped with the ODU, to the controller 24.

Figure 12:
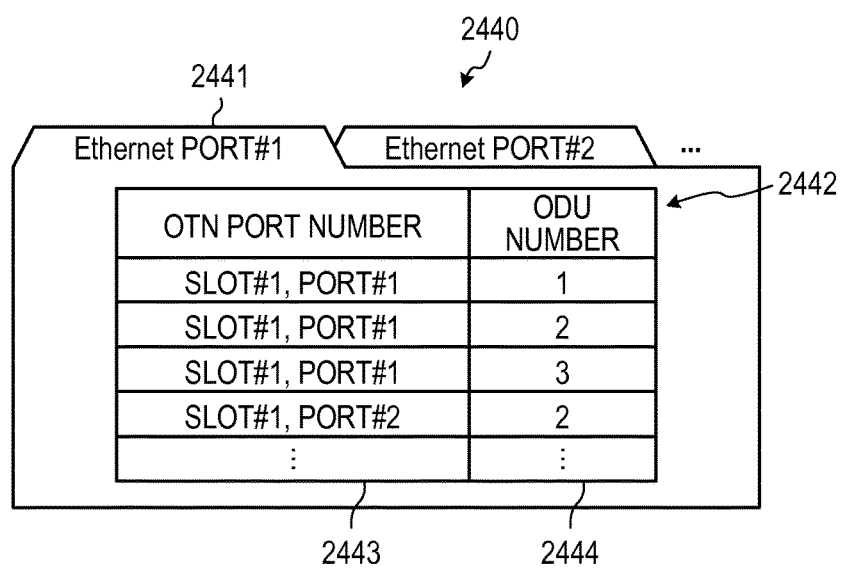
FIG. 12 is a view illustrating an example of an association table according to the third embodiment.

The controller 24 includes an AIS generating unit 241, an association table holding unit 244 and a notification destination specifying unit 245. The association table holding unit 244 holds an association table 2440 as illustrated in FIG. 12. FIG. 12 is a view illustrating an example of the association table 2440 according to the third embodiment. The association table 2440 holds an individual table 2442 for each Ethernet port number 2441 identifying each port 200 connected to the Ethernet 12. Each individual table 2442 stores an ODU number 2444 in association with OTN port information identifying each port 201.

In the association table 2440 illustrated in FIG. 12, "slot#1, port#1" in the port information 2423 indicates that an OTN interface 23 mounted in a No. 1 slot provided in a housing of a transmitter 20 has a No. 1 port 201. The ODU number 2444 indicates an ODU number at a position onto which the ODU is mapped in an OTN frame transmitted/received via the associated OTN port information 2443.

Upon receiving the ODU number and OTN port information from the header information controller 216, the notification destination specifying unit 245 searches the individual table 2442 including the received ODU number and OTN port information in the association table 2440 of the association table holding unit 244. The notification destination specifying unit 245 specifies the Ethernet port number 2441 associated with the searched individual table 2442 and transmits the specified Ethernet port number 2441 to the AIS generating unit 241. The port 200 corresponding to the specified Ethernet port number 2441 is a transmission target port 200 of AIS.

The AIS generating unit 241 generates an AIS indicating whether or not a communication failure occurs in the OTN 13. The AIS generating unit 241 transmits the generated AIS, together with the Ethernet port number 2441 of the transmission target port 200 of AIS, to the flow processor 212.

The flow processor 212 broadcasts the AIS, which is received from the AIS generating unit 241, from the transmission target port 200 of AIS to the Ethernet 12 via the MAC 211 and the PHY 210.

If a physical line failure occurs in the OTN 13, since data in the ODU are broken, the header information controller 216 can detect the physical line failure as a check sum error using an ODU header. As an alternative example, a monitoring function to monitor the physical line failure of the OTN 13 may be installed in each OTN interface 23. The notification destination specifying unit 245 specifies the Ethernet port number corresponding to the port 201 connected to the OTN 13 whose failure is detected by the monitoring function, as a transmission target port 200 of AIS, by referring to the association table 2440 in the association table holding unit 244. The notification destination specifying unit 245 may cause the specified transmission target port 200 of AIS to transmit the AIS to notify the failure of the OTN 13.

The overview of the failure notification process of this embodiment is the same as FIG. 8 and, therefore, the failure notification process of this embodiment will be described with reference to FIG. 8.

First, the header information controller 216 transmits an ODU number of the ODU in which an error is detected, and information of the port 201, which receives an OTN frame mapped with the ODU, to the notification destination specifying unit 245. The notification destination specifying unit 245 searches the individual table 2442 including the ODU number and OTN port information, which are received from the header information controller 216, in the association table 2440 of the association table holding unit 244. The notification destination specifying unit 245 specifies the Ethernet port number 2441 associated with the searched individual table 2442, as an identification number of the transmission target port 200 of AIS (S200). The header information controller 216 transmits the Ethernet port number 2441 of the transmission target port 200 of AIS to the AIS generating unit 241.

The AIS generating unit 241 generates an AIS indicating whether or not a communication failure occurs in the OTN 13 (S201). Then, the AIS generating unit 241 transmits the generated AIS, together with the Ethernet port number 2441 of the transmission target port 200 of AIS, to the flow processor 212 connected to the port 200 of the AIS transmission target.

The flow processor 212 broadcasts the AIS, which is received from the AIS generating unit 241, from the transmission target port 200 of AIS to the Ethernet 12 via the MAC 211 and the PHY 210 (S202).

As described above, according to the transmitter 20 of this embodiment, the communication device connected to the Ethernet 12 can be informed of a failure occurring in the OTN 13.

Here, if a device in the Ethernet 12 uses the CC function of service OAM to detect a communication failure of the OTN 13, the time taken from the occurrence to detection of the failure is at least about ten milliseconds. However, if a transmission interval of the frame for communication confirmation is set to a minimum, traffic of the frame for communication confirmation in the network is increased as much and a pressure is put on a usable bandwidth of a user packet. Therefore, in many cases, the transmission interval of the frame for communication confirmation is set to about several hundred milliseconds to about several seconds rather than the minimum. In these cases, the time taken from the occurrence to detection of the failure is several hundred milliseconds to ten seconds in some cases. Therefore, although a failure is detected in a short time (e.g., within less than one millisecond) in a device in the OTN 13, it may take several ten seconds for a device in the Ethernet 12 to detect the failure occurred in the OTN 13.

In contrast, the transmitter 20 of this embodiment detects, for example, an ODU header error if a failure occurs in the OTN 13. Then, the transmitter 20 transmits an AIS indicating that the failure occurs in the OTN 13, from the port 200 connected to the Ethernet 12 to which a communication device performing communication via the ODU in which an error is detected. Thus, the transmitter 20 of this embodiment can quickly inform the communication device belonging to the Ethernet 12, that the failure occurs in the OTN 13.

Fourth Embodiment

A fourth embodiment is different from the third embodiment in which a failure of the OTN 13 is notified in the unit of port of the transmitter 20, in that the failure of the OTN 13 is notified in the unit of flow in the OTN 13 in which the failure occurs. The overview of the transmission system 10 and the transmitter 20 is the same as those of the third embodiment except for the following description and, therefore, explanation of which will not be repeated.

Figure 13:
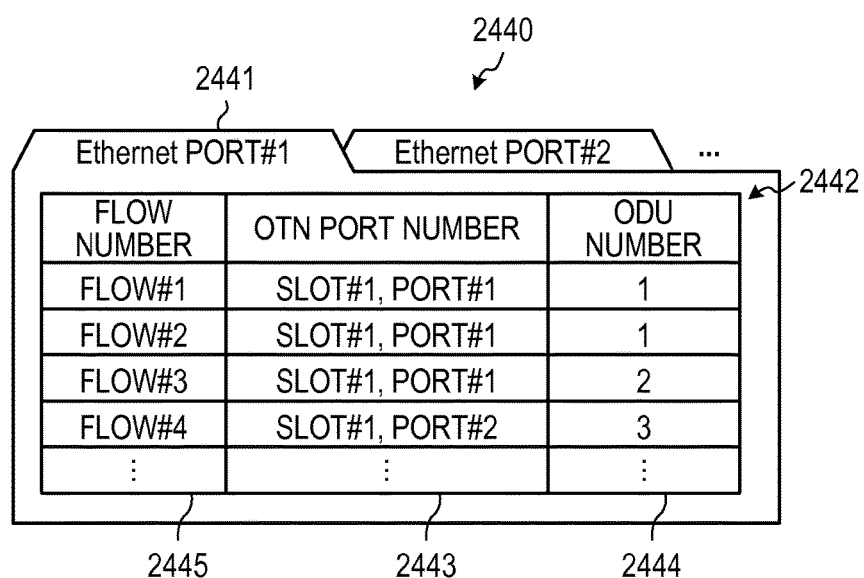
FIG. 13 is a view illustrating an example of an association table according to a fourth embodiment.

FIG. 13 is a view illustrating an example of the association table 2440 according to the fourth embodiment. In this embodiment, the individual table 2442 stores the OTN port information 2443 and ODU number 2444 in association with the flow number 2445 identifying each flow.

Upon receiving the ODU number and OTN port information from the header information controller 216, the notification destination specifying unit 245 searches the individual table 2442 including the received ODU number and OTN port information in the association table 2440 of the association table holding unit 244. The notification destination specifying unit 245 specifies the Ethernet port number 2441 associated with the searched individual table 2442. The specified Ethernet port number 2441 is a port number of the port 200 with a transmission target flow of AIS.

In addition, the notification destination specifying unit 245 specifies the flow number 2445 corresponding to the ODU number and OTN port information received from the header information controller 216 in the searched individual table 2442. The specified flow number 2445 is a flow number of the transmission target flow of AIS. The notification destination specifying unit 245 transmits the port number of the port 200 with the transmission target flow of AIS and the flow number of the transmission target flow of AIS to the AIS generating unit 241.

The AIS generating unit 241 refers to the association table 2440 for each port 200 with the transmission target flow of AIS. The AIS generating unit 241 determines whether or not all of the flows in the port 200 for each port 200 are flows of the AIS transmission target. If all of the flows in the port 200 are flows of the AIS transmission target, the AIS generating unit 241 specifies the port 200 as a shutdown target port 200.

Next, the AIS generating unit 241 specifies an MAC address of a communication device of a transmission destination or transmission source of an AIS transmission target flow for the port 200 where some of flows are AIS transmission target flows.

The AIS generating unit 241 generates an AIS indicating whether or not a communication failure occurs in the OTN 13. The AIS generating unit 241 sets the specified MAC address in the destination MAC address of the generated AIS for the port 200 where some of flows are AIS transmission target flows. Then, the AIS generating unit 241 transmits the generated AIS, together with the Ethernet port number 2441 of the port 200 with the AIS transmission target flow, to the flow processor 212 connected to the port 200 with the AIS transmission target flow.

The flow processor 212 unicasts the AIS, which is received from the AIS generating unit 241, to the port 200 with the AIS transmission target flow via the MAC 211 and the PHY 210.

In addition, upon receiving an identification number of the shutdown target port 200 from the AIS generating unit 241, the flow processor 212 instructs the PHY 210 to shut down a port 200 corresponding to the received identification number. The PHY 210 shuts down the port 200 according to the instruction from the flow processor 212.

The overview of the failure notification process of this embodiment is the same as FIG. 10 and, therefore, the failure notification process of this embodiment will be described with reference to FIG. 10.

First, the header information controller 216 transmits an ODU number of the ODU in which an error is detected, and information of the port 201, which receives an OTN frame mapped with the ODU, to the notification destination specifying unit 245. The notification destination specifying unit 245 searches the individual table 2442 including the ODU number and OTN port information, which are received from the header information controller 216, in the association table 2440 of the association table holding unit 244.

The notification destination specifying unit 245 specifies the Ethernet port number 2441 associated with the searched individual table 2442, as the Ethernet port number 2441 of the port with the AIS transmission target flow (S210). The notification destination specifying unit 245 specifies the flow number 2445 corresponding to the ODU number and OTN port information received from the header information controller 216, as a flow number of the AIS transmission target flow. The notification destination specifying unit 245 transmits the Ethernet port number 2441 of the port 200 with AIS transmission target flow and the flow number of the AIS transmission target flow to the AIS generating unit 241.

Next, the AIS generating unit 241 selects a port 200 unselected among the ports 200 specified in Step S210 (S211). Then, the AIS generating unit 241 determines whether or not all of the flows in the port 200 selected in Step S211 are AIS transmission target flows, by referring to the association table 2440 (S212).

If all of the flows in the port 200 are AIS transmission target flows (Yes in S212), the AIS generating unit 241 transmits the identification number of the selected port 200 as a shutdown target port 200 to the flow processor 212. The flow processor 212 instructs the PHY 210 to shut down the port 200 corresponding to the identification number received from the AIS generating unit 241. The PHY 210 shuts down the port 200 according to the instruction from the flow processor 212 (S217). Then, the AIS generating unit 241 executes a process illustrated in Step S216.

If some flows in the port 200 are not AIS transmission target flows (No in S212), the AIS generating unit 241 specifies an MAC address of a communication device of an AIS transmission destination for each flow of the AIS transmission target (S213).

Next, the AIS generating unit 241 generates an AIS indicating whether or not a communication failure occurs in the OTN 13 via the OTN 13 (S214). Then, the AIS generating unit 241 sets the MAC address, which is specified in Step S213, in a destination MAC address of the generated AIS. Then, the AIS generating unit 241 transmits the generated AIS to the flow processor 212 connected to the port 200 selected in Step S211. The flow processor 212 transmits the AIS, which is received from the AIS generating unit 241, from the port 200 via the MAC 211 and the PHY 210 (S215).

Next, the AIS generating unit 241 determines whether or not all of the ports specified in Step S210 are selected (S216). If there is a port 200 unselected among the ports 200 specified in Step S210 (No in S216), the AIS generating unit 241 executes the process illustrated in Step S211 again. In the meantime, if the AIS generating unit 241 selects all of the ports specified in Step S210 (Yes in S216), the transmitter 20 terminates the failure notification process illustrated in this flowchart.

As described above, according to the transmitter 20 of this embodiment, the communication device belonging to the Ethernet 12 can be quickly informed of the failure occurred in the OTN 13. In addition, according to the transmitter 20 of this embodiment, since the failure of the OTN 13 is notified in the unit of flow, it is possible to suppress an increase in communication traffic caused by the transmission of the failure notification.

Each element of each unit illustrated in the figures described so far is not necessarily required to be physically configured as illustrated. In other words, the specific mode of distribution and integration of each unit is not limited to those illustrated in the figures but all or some thereof may be functionally or physically distributed or integrated in arbitrary units depending on various loads or use conditions.

In addition, various processing functions performed in the transmitter 20 may be entirely or partially executed on a CPU (Central Processing Unit) (or a microcomputer such as an MPU (Micro Processing Unit) or an MCU (Micro Controller Unit)). In addition, it is to be understood that the various processing functions may be entirely or partially executed on a program analyzed and executed in the CPU (or the microcomputer such as MPU or MCU) or on hardware by a wired logic.

Figure 14:
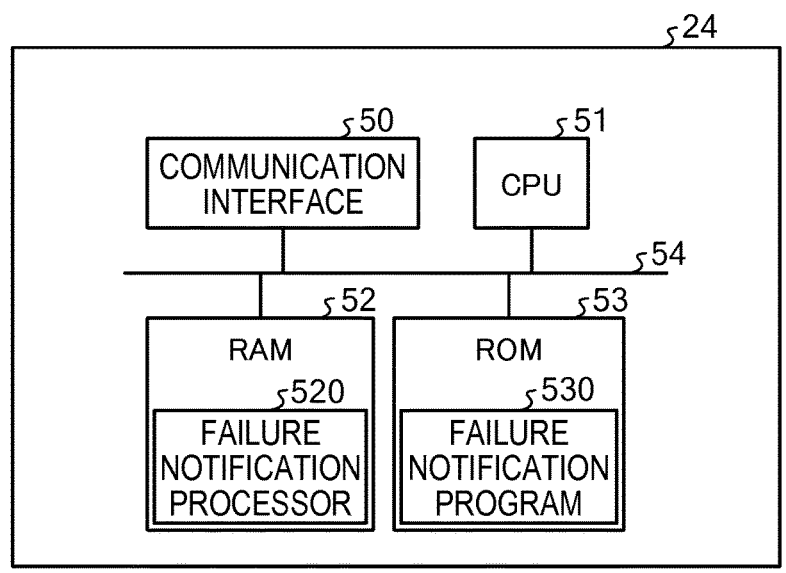
FIG. 14 is a view illustrating an example of hardware of a controller.

The processes described in the above embodiments are implemented by executing a program prepared in advance in the controller 24. Therefore, one example of the controller 24 executing a program having the same functions as the above embodiments will be described below. FIG. 14 is a view illustrating an example of hardware of the controller 24.

As illustrated in FIG. 14, the controller 24 includes a communication interface 50, a CPU 51, a RAM (Random Access Memory) 52 and a ROM (Read Only Memory) 53, which are interconnected via a bus 54.

The ROM 53 stores a failure notification program 530. The CPU 51 reads the failure notification program 530 from the ROM 53 and deploys the read program 530 in the RAM 52. The failure notification program 530 may be appropriately integrated with or separated from the elements illustrated in FIG. 4 or 11.

The CPU 51 reads the failure notification program 530 from the ROM 53. Then, the CPU 51 deploys the read program 530, as a failure notification process 520, in the RAM 52. Then, the CPU 51 executes the failure notification process 520 deployed on the RAM 52 in the above embodiments. For example, in the first and second embodiments, the CPU 51 shows the same functions as the failure information changing unit 240, the AIS generating unit 241, the failure information table holding unit 242 and the failure notification frame generating unit 243. In addition, for example, in the second and fourth embodiments, the CPU 51 shows the same functions as the AIS generating unit 241, the association table holding unit 244 and the notification destination specifying unit 245.

In addition, the CPU 51 executes the process illustrated in FIGS. 7 and 8 by executing the failure notification process 520 deployed on the RAM 52 in the first embodiment. In addition, the CPU 51 executes the process illustrated in FIG. 10 by executing the failure notification process 520 deployed on the RAM 52 in the second embodiment. In addition, the CPU 51 executes the process illustrated in FIG. 8 by executing the failure notification process 520 deployed on the RAM 52 in the third embodiment. In addition, the CPU 51 executes the process illustrated in FIG. 10 by executing the failure notification process 520 deployed on the RAM 52 in the fourth embodiment.

All of the processing units virtually realized by the CPU 51 may not be always realized by the CPU 51 but only processing units used for the processing may be virtually realized. In addition, the failure notification program 530 may not be necessarily stored in the ROM 53 from the beginning. For example, a program may be stored in a portable recording medium such as an IC card inserted in the controller 24 and the controller 24 may acquire and execute the program from the portable recording medium. In addition, the controller 24 may acquire and execute the program from a separate computer or server storing the program via, for example, a radio communication line, a public line, the Internet, LAN, or WAN.

In the first and second embodiments, the failure notification frame generating unit 243 generates a failure notification frame when a failure occurs in the Ethernet 12, and transmits the generated failure notification frame to the transmitter 20 connected to the opposing side Ethernet 12 via the OTN 13. However, the present invention is not limited thereto. For example, the failure notification frame generating unit 243 may store the failure information of the Ethernet 12 in a header of ODU of an ODU number mapped with an Ethernet frame via the port 200 connected to the Ethernet 12 in which a failure occurs. Thus, the failure notification frame generating unit 243 can transmit the port 200 connected to the Ethernet 12 in which the failure occurs and the failure information indicating the status of the port 200, in association with the ODU number. This makes it possible to eliminate a need of transmission of a new frame for failure notification and avoid an increase in communication traffic caused by the failure notification.

In this case, the header information controller 216 illustrated in the third embodiment may be installed in the ODU mapping processor 213 illustrated in the first and second embodiments and may determine whether or not the failure information is included in the ODU header. If the failure information is included in the ODU header, the header information controller 216 transmits the failure information, together with the ODU number in which the header including the failure information is stored, to the AIS generating unit 241.

While the exemplary embodiments of the present disclosure has been illustrated and described with reference to the drawings, the present disclosure is not limited to the disclosed embodiments. Rather, it is obvious to those skilled in the art that the disclosed embodiments may be changed and modified in different ways without departing from the spirit and scope of the present disclosure defined in the Claims and equivalents thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of superiority and inferiority of the invention. Although the embodiments of the present invention have been described in detail, it should be understood that the various changes, substitutions, and alterations could be made hereto without departing from the spirit and scope of the invention.

What is claimed is:

1. A transmitter used in a transmission system in which a first network is connected, via a second network, to a third network, the transmitter being arranged between the first network and the second network, the transmitter comprising:
   a hardware network interface that provides a plurality of ports;
   a hardware processor coupled to the hardware network interface and configured to:
      receive information of a target port coupled to the first network at which a failure occurred among the plurality of ports,
      specify an identifier of a data area corresponding to the target port in a frame transmitted from the second network, the data area being an area in which communication data affected by the failure are stored, by referring to failure information in which an identifier and a status of a plurality of ports are associated with each other for each of a plurality of identifiers,
      generate a failure notification frame for notifying the failure using the specified identifier, and
      transmit the generated failure notification frame to the hardware network interface,
   wherein the hardware network interface is configured to:
      receive the generated failure notification frame from the hardware processor, and
      transmit the received failure notification frame to another transmitter arranged between the second network and the third network via the second network.

2. The transmitter according to claim 1, further comprising:
   a memory that stores the failure,
   wherein the hardware processor is configured to specify the identifier of the data area by referring to the memory.

3. The transmitter according to claim 2 wherein the hardware network interface is configured to:
   when the hardware network interface receives failure information associated with the specified identifier from the another transmitter via the second network, specify a port corresponding to the specified identifier associated with the received failure information, by referring to the memory, and
   notify a device in the first network connected to the specified port of a failure occurrence.

4. The transmitter according to claim 3, wherein the hardware network interface notifies the device in the first network connected to the specified port of the failure occurrence by shutting down the specified port, based on the failure information received from the another transmitter via the second network.

5. The transmitter according to claim 3,
   wherein the failure information associates a flow including a series of communication data flowing in the first network with the identifier, and
   wherein the hardware processor is configured to:
      store information specifying the flow in the first network in which a failure occurs, in the failure information, and
      notify, of the failure occurrence, a device transmitting or receiving communication data included in the flow specified by the failure information received, among devices in the first network connected to the specified port, based on the failure information received from the another transmitter via the second network.

6. The transmitter according to claim 5 the hardware processor is configured to
   when the flow in the port specified based on the failure information received from the another transmitter via the second network is all included in a plurality of flows specified by the failure information, notify, of the failure occurrence, the device transmitting or receiving communication data included in the flow specified by the failure information received, by shutting down the specified port.

7. The transmitter according to claim 3, wherein the hardware processor is configured to:
   associate the failure information with the identifier by storing the failure information in a header of the data area in which the communication data affected by the failure of the first network are stored in the frame transmitted from the second network, and
   specify a port corresponding to the identifier indicating a mapping position of the communication data having the header stored with the failure information, by referring to the memory.

8. The transmitter according to claim 1, wherein the hardware network interface is configured to:
   execute an optical channel data unit (ODU) mapping processing to the received failure notification frame, and
   transmit the processed failure notification frame to the another transmitter.

9. A transmission system comprising:
   a first transmitter provided between a first network and a second network; and
   a second transmitter provided between the second network and a third network,
   wherein the first transmitter includes:
      a hardware network interface that provides a plurality of ports;
      a hardware processor coupled to the hardware network interface and configured to:
         receive information of a target port coupled to the first network at which a failure occurred among the plurality of ports,
         specify an identifier of a data area corresponding to the target port in a frame transmitted from the second network, the data area being an area in which communication data affected by the failure are stored, by referring to failure information in which an identifier and a status of a plurality of ports are associated with each other for each of a plurality of identifiers,
         generate a failure notification frame for notifying the failure using the specified identifier, and
         transmit the generated failure notification frame to the hardware network interface,
      wherein the hardware network interface is configured to:
         receive the generated failure notification frame from the hardware processor, and
         transmit the received failure notification frame to the second transmitter via the second network.

* * * * *